United States Patent [19]

Okada et al.

[11] 4,446,210

[45] May 1, 1984

[54] FUEL CELL ELECTRODE

[75] Inventors: Hideo Okada; Jinichi Imahashi, both of Hitachi; Seizi Takeuchi, Hitachiota; Sigeru Okabe, Hitachi; Toshiki Kahara; Kenzo Ishii, both of Ibaraki; Masato Takeuchi, Katsuta; Shimpei Matsuda, Ibaraki; Kohki Tamura, Hitachi; Hiroshi Tobita, Kitaibaraki, all of Japan

[73] Assignee: Hitachi, Ltd., Tokyo, Japan

[21] Appl. No.: 366,768

[22] Filed: Apr. 8, 1982

[30] Foreign Application Priority Data

Apr. 8, 1981 [JP] Japan ................................ 56-51816

[51] Int. Cl.$^3$ ............................................. H01M 4/86
[52] U.S. Cl. ......................................... 429/42; 429/44
[58] Field of Search ............................. 429/44, 45, 42

[56] References Cited

U.S. PATENT DOCUMENTS

| | | | |
|---|---|---|---|
| 3,230,114 | 1/1966 | Fuesl et al. | 136/86 |
| 3,428,490 | 2/1969 | Bearo et al. | 136/86 |
| 4,044,193 | 8/1977 | Petrow | 429/44 X |
| 4,237,195 | 12/1980 | Alfenaar | 429/44 |
| 4,293,396 | 10/1981 | Allen et al. | 429/44 X |
| 4,299,682 | 11/1981 | Oda et al. | 429/42 X |
| 4,369,104 | 1/1983 | Beckley | 429/44 X |

Primary Examiner—Charles F. LeFevour
Attorney, Agent, or Firm—Antonelli, Terry & Wands

[57] ABSTRACT

A fuel cell electrode being substantially free from cracks on the surface of catalyst layer on the electrode and having a good electrode performance under the atmospheric pressure or under pressure when assembled into a fuel cell, which comprises a gas-diffusing electroconductive substrate with continued pores and a water-repellent catalyst layer comprising electroconductive submicron particles having a catalyst, electroconductive materials each having a volume $10^3$–$10^{10}$ as large as the volume of the largest particle of the submicron particles and, if necessary, having a catalyst, and a water-repellent polymer as a binder, the electroconductive submicron particles and the electroconductive materials being provided in a mixing ratio by volume of the former to the latter of 95–50 to 5–50.

23 Claims, 3 Drawing Figures

FUEL CELL ELECTRODE

BACKGROUND OF THE INVENTION

This invention relates to a fuel cell electrode.

According to one example of a fuel cell electrode, a layer of electroconductive particles having a catalyst is provided on a porous electroconductive substrate such as carbon paper or carbon filter cloth. Such an electrode is used in a fuel cell using phosphoric acid as an electrolyte or in a fuel cell using methanol or hydrazine as a fuel. The electrode is usually prepared by kneading electroconductive particles having a catalyst with a water-repellent polymer and a solvent, applying the resulting paste to the surface of an electroconductive substrate, and then drying and baking the substrate. U.S. Pat. No. 4,043,933 discloses one example of a process for preparing such an electrode.

As a result of investigation of such electrodes, the present inventors have found that a large number of fine cracks are formed on a catalyst layer at the drying or baking, and an electrolyte leaks into the electrode through the cracks.

In the catalyst layer of a fuel cell electrode, electrochemical reaction takes place at three-phase boundaries between the electrode catalyst, and electrolyte and diffused fuel gas, but when cracks are generated on the catalyst layer of the electrode, the electrolyte directly leaks into the cracks, so that the electrochemical reaction hardly takes place at the three-phase boundaries. Furthermore, generated cracks lower the strength of the catalyst layer, which is readily peelable from the substrate, considerably lowering the performance and life of fuel cells.

SUMMARY OF THE INVENTION

An object of the present invention is to provide a fuel cell electrode substantially free from cracks on the electrode catalyst layer.

The present invention provides a fuel cell electrode, which comprises a gas-diffusing electroconductive substrate with continued pores and a water-repellent catalyst layer comprising electroconductive submicron particles having a catalyst, electroconductive materials each having a volume $10^3$–$10^{10}$ as large as the volume of the largest particle of the submicron particles and, if necessary, having a catalyst, and a water repellent polymer as a binder, the electroconductive submicron particles and the electroconductive materials being provided in a mixing ratio by volume of the former to the latter of 95–50 to 5–50.

As an extensive study of a cause for generation of cracks on a catalyst layer of a fuel cell electrode, the present inventors have found the following fact.

Cracks generate on a catalyst layer of a fuel cell electrode by evaporation of a solvent such as water, alcohol, or the like from the catalyst layer at drying or baking, and by subsequent migration of electroconductive particles due to contraction of the catalyst layer by the evaporation. A catalyst layer comprising a mixture of electroconductive submicron particles and electroconductive materials each having a volume at least $10^3$ as large as that of the largest particle of the electroconductive submicron particles undergoes no migration of the electroconductive materials having such large volumes due to their own large weights, and the presence of the electroconductive materials having such large volumes prevents the electroconductive submicron particles from migration within the catalyst layer. Thus, the migration of electroconductive particles and materials can be prevented completely or substantially completely as the whole. Such a migration, even though it takes place, can be restricted to very small locations. The entire electroconductive particles can be made from the coarse electroconductive materials as used in the present invention to prevent such migration, but the specific surfaces of the electroconductive materials are smaller, so that the amount of catalysts on such materials will be smaller, that is, the area available to the electrochemical reaction will be reduced, rendering the catalyst activity lower.

In the present invention, the electroconductive submicron particles having smaller particle size are desirable for larger specific surface area, that is, for higher catalytic activity. The particle size of up to a few $\mu$m at the largest is preferable.

Electroconductive submicron particles having an average particle size of not more than 0.5 $\mu$m and having a catalyst thereon are very high in the catalytic activity. The average particle size means the particle size at 50% in the measurement of particle size distribution. The average particle size can be measured by sieving, by measuring sedimentation speed of particles in a liquid, or by an electron microscope.

The catalyst must be supported at least on the electroconductive submicron particles from the viewpoint of catalytic activity, but can be supported on both electroconductive submicron particles and electroconductive materials.

The electroconductive materials must have such a size as not to be migrated into spaces formed by the evaporation of a solvent in the catalyst layer. The electroconductive materials each having a volume at least $10^3$ as large as that of the largest particle of the electroconductive submicron particles can satisfy the foregoing condition. In view of desired uniform distribution, etc. of electroconductive submicron particles having catalysts, the maximum size of the electroconductive materials preferably must correspond to a volume not larger than $10^{10}$ times that of the largest particle of the electroconductive submicron particles, and must be not larger than the thickness of the catalyst layer. The particle sizes are values of particle sizes in a prepared electrode, measured by electron microscope observation.

The electroconductive materials are mixed into the catalyst layer to prevent migration of electroconductive submicron particles owing to immobilization of the former, as described before, and thus it is not necessary to mix too large an amount of the former with the latter, and rather the amount of the former must be restricted to the necessary minimum amount. To this end, it has been found that a satisfactory mixing ratio by volume of electroconductive submicron particles to electroconductive materials is 95–50:5–50, preferably 90–70:10–30. It is desirable that the amount of the submicron particles having the catalyst, the electroconductive materials, and the binder is at least 90% by volume of the total on the electroconductive substrate. Electroconductive particles having sizes between those of the electroconductive submicron particles and those of the electroconductive materials are preferably in an amount of less than 10% by volume on the basis of total of the electroconductive particles and materials. It has been found that the substantial absence of electroconductive particles having such intermediate sizes improves a flowability of a paste as obtained by mixing of the electroconductive submicron particles and electroconductive materials with a water-repellent polymer and a solvent, and thus facilitates applicability of the paste to the surface of an electroconductive substrate. Furthermore, it forms appropriate voids, thereby improving diffusability of reaction gas and readily providing three-phase boundaries between the catalysts, electrolyte and reaction gas necessary for the electrochemical reaction.

For the electroconductive submicron particles and electroconductive materials it is desirable to use carbon having good resistance to an electrolyte. The carbon for use in the present invention includes carbon black, for example, furnace black and acetylene black, activated carbon, graphite, etc. The electroconductive submicron particles are desirably carbon black, preferably acetylene black. Other applicable materials than carbon include tantalum, tungsten, platinum, ruthenium, rhodium, iridium, etc. in powdery or fibrous forms. Suitable combinations of materials and shape of electroconductive submicron particles and electroconductive materials for use in the present invention are given below:

(1) A mixture of acetylene black as the electroconductive submicron particles and graphite particles as the electroconductive materials,
(2) a mixture of acetylene black as the electroconductive submicron particles and fibrous graphite as the electroconductive materials, and
(3) a mixture of acetylene black as the electroconductive submicron particles and graphite particles and fibrous graphite as the electroconductive materials.

Mixture (1) has a better flowability and a better applicability to an electroconductive substrate of a paste, when prepared, than a combination of single carbon black or single graphite particles.

Mixture (2) has an improved cell life, because the fibrous graphite works as cores and suppresses the generation of cracks. Mixture (3) has the advantages of mixtures (1) and (2) appropriately.

The fibrous graphite for use in the present invention must have a diameter of 4-5 $\mu$m, and length of 0.1-1 mm, preferably 0.2-0.5 mm. As the gas-diffusible electroconductive substrate, carbon paper in a plate or sheet form, which will be hereinafter referred to as "sheet", is desirable. The carbon paper is prepared from carbon fibers and a binder, for example, phenol resin, according to a paper making procedure. Desirable carbon paper is a sheet having a porosity of 85-90% and a thickness of 0.2-1 mm.

Any catalyst as used for fuel cell can be used in the present invention. Noble metal catalysts such as platinum, palladium, iridium, and the like are preferable catalyst components. The catalyst can be supported onto electroconductive submicron particles, for example, by mixing carbon black as the electroconductive submicron particles with an aqueous chloroplatinic acid solution, and reducing chloroplatinic acid by a reducing agent such as methanol or formic acid, whereby platinum particles having sizes of a few tens Å can be supported onto the surfaces of carbon black. When electroconductive materials are mixed into the aqueous chloroplatinic acid solution together with electroconductive submicron particles, platinum particles can be supported also on the surfaces of the electroconductive materials.

Once, for example, the platinum catalyst has been supported on the surfaces of electroconductive submicron particles, for example, carbon black, the carbon black is then mixed with electroconductive materials, for example, graphite particles, and further admixed with water as a solvent, and kneaded. Then, the mixture for forming a catalyst layer is admixed with 20-30% by weight of a polytetrafluoroethylene (teflon) dispersion comprising, for example, 60% by weight of teflon particles having a particle size of 0.3 $\mu$m and 40% by weight of water, together with an effective amount of a surfactant, on the basis of the mixture to make a paste.

The resulting paste is applied to a gas-diffusing electroconductive substrate with continued pores, for example, a porous carbon sheet (porosity 85%, thickness 0.2-1 mm) prepared from carbon fibers with phenol resin as a binder according to the paper-making procedure. The resulting substrate is dried in air at room temperature, and then baked at about 290° C. so that the water-repellent polymer can remain in the resulting catalyst layer. The catalyst layer on the resulting electrode is preferably 0.02-0.2 mm in thickness, where teflon binds the electroconductive submicron particles and electroconductive materials to one another, or binds them to the electroconductive substrate and also renders the resulting catalyst layer water-repellent, contributing to formation of three-phase boundaries. The catalyst layer on the electroconductive substrate must be made water-repellent at least at the electrolyte side. By appropriate selection of a ratio by volume and mixing ratio by volume of the electroconductive materials to the electroconductive submicron particles, generation of cracks can be prevented at the drying and baking.

The present invention will be described in detail below, referring to Examples and Drawings.

PREFERRED EMBODIMENTS OF THE INVENTION

Example 1

Figure 1:
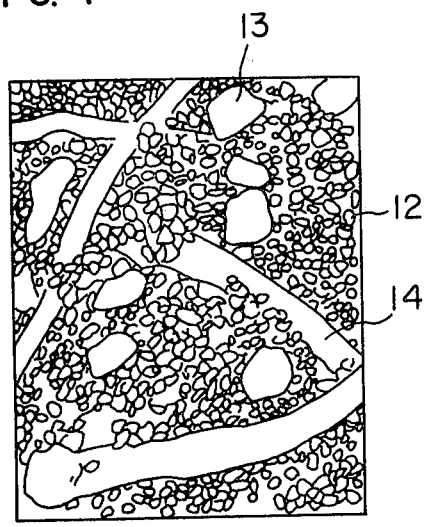
FIG. 1 is a schematic plan view of a fuel cell electrode according to the present invention by electron microscope observation.

Acetylene black submicron particles having particle sizes of 0.1-0.3 $\mu$m (average particle size: 0.25 $\mu$m) was mixed in an aqueous chloroplatinic acid solution, and subjected to reduction by methanol as a reducing agent to prepare platinum-supporting acetylene black catalyst having 10% by weight of platinum on the acetylene black. Electroconductive materials having a volume about $10^3$ as large as that of the largest particle of the submicron particles, i.e. graphite particles having particle sizes of 3.0-3.5 $\mu$m and an average particle size of 3.1 $\mu$m were mixed with the submicron particles at a mixing ratio by volume of the submicron particles to the graphite particles of 80:20, and then admixed with water as a solvent, and kneaded. Then, the resulting mixture was admixed with about 20% by weight of a polytetrafluoroethylene dispersion, and kneaded to obtain a paste. The resulting paste was applied to carbon paper having a dimension of 10 cm wide, 10 cm long and 0.5 mm thick by a doctor knife, and dried at room temperature for about 8 hours, and then baked at 290° C. for 2 hours. The amount of the resulting catalyst layer (platinum+acetylene black+graphite particles+polytetrafluoroethylene) was 5 mg/cm$^2$.

The flat catalyst layer was obtained without any crack at all on the surface of carbon paper.

EXAMPLE 2

A fuel cell electrode was prepared in the same manner as in Example 1, except that graphite particles having a different particle size distribution range and a different average particle size was used as the electroconductive materials. That is, graphite particles having particle sizes of 30–35 μm and an average particle size of 30.5 μm and having a volume about 10$^4$ as large as that of the largest particle of the acetylene black submicron particles was used as the electroconductive materials.

A flat catalyst layer was obtained without any crack at all on the surface of carbon paper.

EXAMPLE 3

Catalyst having 5% by weight of platinum black on acetylene black submicron particles having a maximum particle size of 1 μm and an average particle size of 0.2 μm were prepared in the same manner as in Example 1, whereas catalysts having 5% by weight of platinum black on graphite particles having particle sizes of 100 to 300 μm were prepared in the same manner as in Example 1. These two submicron particles and graphite particles were mixed together at a mixing ratio by volume of 50:50 and prepared into an electrode in the same manner as in Example 1, except that the amount of the resulting catalyst layer (platinum+acetylene black particles+graphite particles+polytetrafluoroethylene) was 10 mg/cm$^2$ and drying time was 5 hours. A flat catalyst layer was obtained without any crack at all on the carbon paper.

EXAMPLE 4

Catalysts having 5% by weight of platinum black on acetylene black submicron particles having a maximum particle size of 1 μm and an average particle size of 0.2 μm was prepared in the same manner as in Example 1, and fibrous graphite having an average diameter of 5 μm and a length of 1–3 mm as electroconductive materials was thoroughly mixed with the acetylene black with the catalyst in a mortar at a mixing ratio by volume of the acetylene black particles to the fibrous graphite of 80:20, and prepared into an electrode in the same manner as in Example 1, except that drying time was 5 hours. A flat catalyst layer could be formed readily by a doctor knife.

No cracks were produced at all on the surface of the resulting catalyst layer.

EXAMPLE 5

An electrode having a catalyst layer containing graphite particles and fibrous graphite as the electroconductive materials was prepared in the same manner as in Example 1.

The particle sizes of particles and the amount of supported platinum black are given in Table 1. The acetylene black submicron particles were mixed with graphite particles at a mixing ratio by volume of the former to the latter of 5:4, and further mixing with fibrous graphite at a mixing ratio by volume of the submicron particles to the fibrous graphite of 5:1. The drying time was 5 hours. A flat catalyst layer was readily obtained without any crack at all on the surface of carbon paper as shown in FIG. 1, where numeral 12 shows acetylene black submicron particles, 13 graphite particles, and 14 fibrous graphite.

TABLE 1

|  | Particle size | Platinum black supported |
|---|---|---|
| Acetylene black submicron particles | maximum 1 μm average 0.3 μm | 5 wt. % |
| Graphite particles | 50–70 μm | 5 wt. % |
| Fibrous graphite | 4–5 μm in diameter 0.1–1 mm in length | 0 wt. % |

Comparative Example 1

Figure 2:
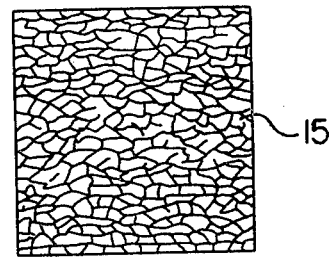
FIG. 2 is a schematic plan view of a fuel cell electrode according to a comparative example by electron microscope observation.

A electrode having a catalyst layer was prepared in the same manner as in Example 1, except that no electroconductive materials were used. A large number of fine cracks 15 were generated on the surface of the catalyst layer, as shown in FIG. 2.

Comparative Example 2

Platinum black was supported on graphite particles having an average particle size of 200 μm and particle sizes of 110–320 μm in the same manner as in Example 1. Then, the resulting mixture was admixed with water, and kneaded, and then admixed with 20% by weight of a polytetrafluoroethylene dispersion, and further kneaded. The mixture turned into a rubbery state during the kneading, and could not be applied to carbon paper.

EXAMPLE 6

Figure 3:
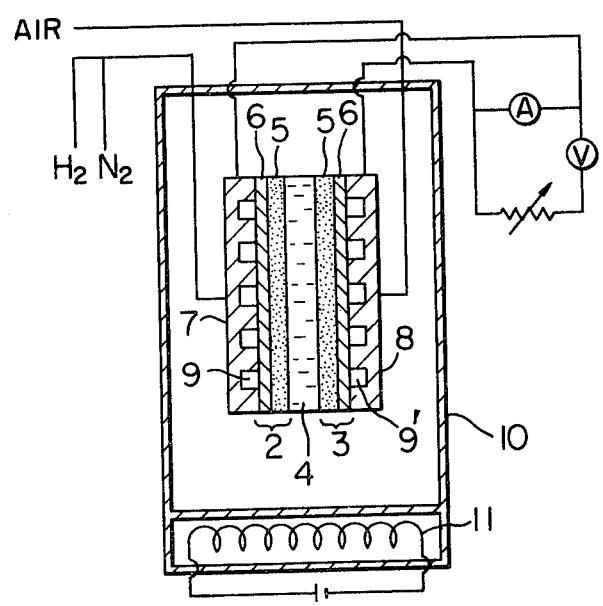
FIG. 3 is a schematic view of a test apparatus used for measurement of cell performance of fuel cell electrodes prepared according to Examples and Comparative Example.

Unit cells were prepared, using the electrodes of Examples 1–5 and Comparative Example 1 to investigate performances of the electrodes in the unit cells under the atmospheric pressure. The structure of unit cells and the structure of test apparatus are shown in FIG. 3. An actual fuel cell was comprised of unit cells of this type being connected one after another in series. The unit cell comprised an anode 2, a cathode 3, phosphoric acid electrolyte 4, and cell frames, which comprised a cell frame 7 at the anode side and a cell frame 8 at the cathode side. In FIG. 3, a catalyst layer 5 and an electroconductive substrate (carbon paper) 6 are shown as members for the anode 2 or cathode 3. The unit cell was encased in a thermostat tank 10 and heated to an operating temperature by a heater 11. The operating temperature was set to 180° C. A mixed gas containing 70% by weight of H$_2$, the balance being N$_2$, was supplied to the anode through a gas passage 9, while air was supplied to the cathode 3 through a gas passage 9'. A voltage was measured between the terminals connected to both electrodes through a load circuit. The results are shown in Table 2.

TABLE 2

|  | Cell voltage V (at a load of 100 mA/cm$^2$) | | |
|---|---|---|---|
|  | Initial | After 50 hours | After 100 hours |
| Example 1 | 0.71 | 0.70 | 0.68 |
| Example 2 | 0.73 | 0.72 | 0.70 |
| Example 3 | 0.69 | 0.67 | 0.66 |
| Example 4 | 0.75 | 0.75 | 0.74 |
| Example 5 | 0.72 | 0.72 | 0.70 |

TABLE 2-continued

| | Cell voltage V (at a load of 100 mA/cm$^2$) | | |
|---|---|---|---|
| | Initial | After 50 hours | After 100 hours |
| Comp. Ex. 1 | 0.70 | 0.51 | 0.42 |

Electrodes of Examples 1–5 are excellent in the initial performance as well as in the performances after the specific periods of time, where the decrease in the performance with time is small. Among others, the electrode of Example 4 using fibrous graphite as the electroconductive substance is distinguished in performance. On the other hand, the electrode of Comparative Example 1 is excellent in the initial performance, but the performance is rapidly decreased with time.

EXAMPLE 7

The unit cell using the electrodes of Example 4 was built up as in Example 6, and placed in a high pressure vessel, and cell performance was investigated under an inside pressure and outside pressure of the unit cell being each 8.5 atmospheres. The results are shown in Table 3.

TABLE 3

| | Cell voltage (at a load of 100 mA/cm$^2$) | | |
|---|---|---|---|
| | Initial | After 50 hours | After 100 hours |
| Example 7 | 0.85 | 0.85 | 0.83 |

As described above, generation of cracks on a catalyst layer can be prevented at drying or baking after the catalyst layer is applied to an electroconductive substrate according to the present invention.

What is claimed is:

1. A fuel cell electrode, adapted to have a side thereof facing an electrolyte, which comprises a gas-diffusing electroconductive substrate in a sheet form with continued pores and a catalyst layer consisting essentially of a mixture of electroconductive submicron particles having a catalyst, electroconductive materials each having a volume $10^3$–$10^{10}$ as large as the volume of the largest particle of the submicron particles and a binder, the catalyst layer being provided at the electrolyte-facing side of the electroconductive substrate, the catalyst layer being made water-repellant at least at the electrolyte side, the electroconductive submicron particles and the electroconductive materials being provided in a mixing ratio by volume of the former to the latter of 95–50 to 5–50, whereby generation of cracks on the catalyst layer at drying or baking of the catalyst layer after application of catalyst to the electroconductive substrate is substantially prevented.

2. The fuel cell electrode according to claim 1, wherein the electroconductive submicron particles and the electroconductive materials are comprised of carbon.

3. The fuel cell electrode according to claim 2, wherein the electroconductive submicron particles are comprised of carbon black, and the electroconductive materials are comprised of graphite particles.

4. The fuel cell electrode according to claim 2, wherein the electroconductive submicron particles are comprised of carbon black, and the electroconductive materials are comprised of fibrous graphite.

5. The fuel cell electrode according to claim 2, wherein the electroconductive submicron particles are comprised of carbon black, and the electroconductive materials are comprised of a mixture of graphite particles and fibrous graphite.

6. The fuel cell electrode according to any one of claims 3, 4, and 5, wherein the carbon black is acetylene black.

7. The fuel cell electrode according to claim 4 or 5, wherein the fibrous graphite has a diameter of 4–5 μm and a length of 0.1–1 mm.

8. The fuel cell electrode according to claim 1, wherein the submicron particles are carbon black.

9. The fuel cell electrode according to claim 8, wherein the carbon black is acetylene black.

10. The fuel cell electrode according to claim 1, wherein the electroconductive submicron particles and the electroconductive materials are comprised of materials selected from the group consisting of carbon, tantalum, tungsten, platinum, ruthenium, rhodium and iridium.

11. The fuel cell electrode according to claim 1, 2 or 10, wherein not more than 10% by volume of electroconductive particles having intermediate particle sizes between the particle size of the electroconductive submicron particles and that of the electroconductive materials is contained.

12. The fuel cell electrode according to claim 1, 2 or 10, wherein the electroconductive substrate is a carbon paper sheet.

13. The fuel cell electrode according to claim 12, wherein the carbon paper has a thickness of 0.2–1 mm.

14. The fuel cell electrode according to claim 1, 2 or 10, wherein the amount of the submicron particles having the catalyst, electroconductive materials, and the binder is at least 90% by volume of the total on the electroconductive substrate.

15. The fuel cell electrode according to claim 1, 2 or 10, wherein the electroconductive submicron particles have an average size of not more than 0.5 μm.

16. The fuel cell electrode according to claim 1, 2 or 10, wherein the catalyst layer is 0.02–0.2 mm thick, and the maximum particle size of the electroconductive materials is less than the thickness of the catalyst layer.

17. The fuel cell electrode according to claim 1, 2 or 10, wherein the binder is a water-repellent polymer.

18. The fuel cell electrode according to claim 17, wherein said polymer is polytetrafluoroethylene.

19. The fuel cell electrode according to claim 1, 2 or 10, wherein the electroconductive materials are fibers having a length of 0.1–1 mm.

20. The fuel cell electrode according to claim 1, 2 or 10, wherein the mixing ratio by volume of electroconductive submicron particles to electroconductive materials is 90–70:10–30.

21. A fuel cell electrode, adapted to have a side thereof facing an electrolyte, which comprises a gas-diffusing electroconductive substrate in a sheet form with continued pores and a catalyst layer consisting essentially of a mixture of electroconductive submicron particles having a catalyst, electroconductive materials each having a volume $10^3$–$10^{10}$ as large as the volume of the largest particle of electroconductive submicron particles and having a catalyst, and a binder, the catalyst layer being provided at the electrolyte-facing side of the electroconductive substrate, the catalyst layer being made water-repellent at least at the electrolyte side, the electroconductive submicron particles and the electroconductive materials being provided in a mixing ratio by volume of the former to the latter of 95–50 to 5–50, whereby generation of cracks on the catalyst layer at drying or baking of the catalyst layer after application of catalyst to the electroconductive substrate is substantially prevented.

22. The fuel cell electrode according to claim 21, wherein the electroconductive submicron particles and the electroconductive materials are comprised of materials selected from the group consisting of carbon, tantalum, tungsten, platinum, ruthenium, rhodium and iridium.

23. The fuel cell electrode according to claim 22, wherein the electroconductive submicron particles and the electroconductive materials are comprised of carbon.

* * * * *